G. M. ANDERSON.
NUT TIGHTENER FOR SILO RODS, &c.
APPLICATION FILED JAN. 24, 1913.
1,071,496.
Patented Aug. 26, 1913.
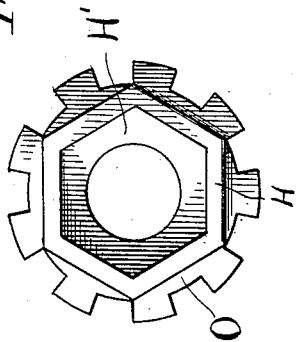
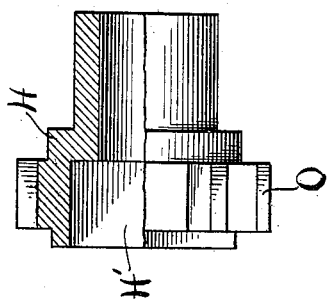
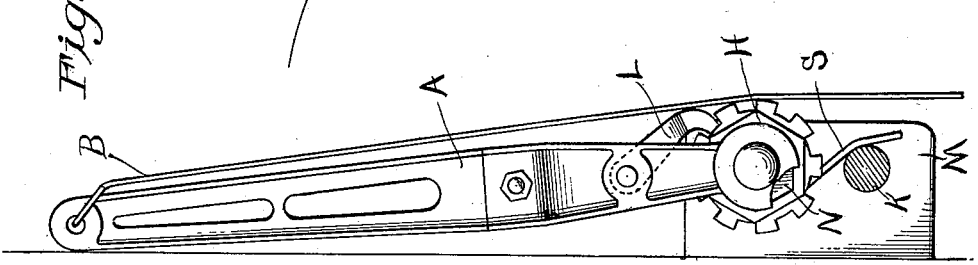
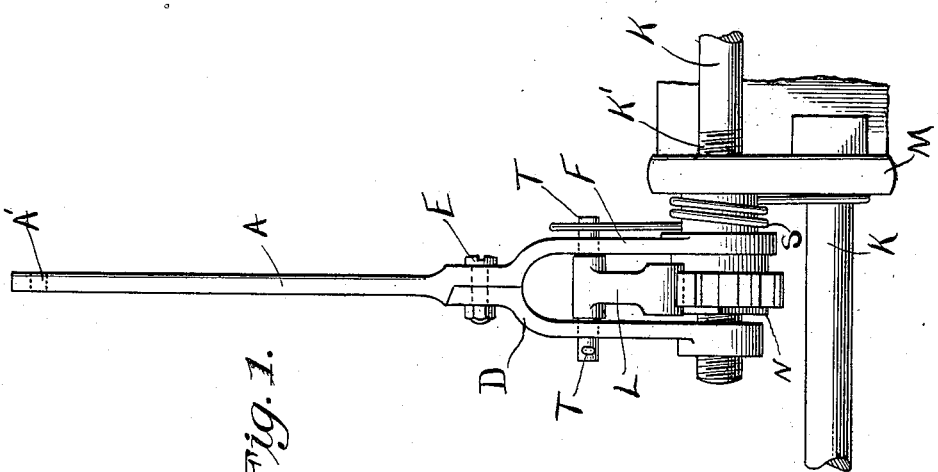
WITNESSES
Fenton S. Belt
J. W. Sherwood
INVENTOR
G. M. Anderson,
By A. L. Hough
Attorney

UNITED STATES PATENT OFFICE.

GEORGE M. ANDERSON, OF INWOOD, IOWA.

NUT-TIGHTENER FOR SILO-RODS, &c.

1,071,496.   Specification of Letters Patent.   Patented Aug. 26, 1913.

Application filed January 24, 1913. Serial No. 743,989.

*To all whom it may concern:*

Be it known that I, GEORGE M. ANDERSON, citizen of the United States, residing at Inwood, in the county of Lyon and State of Iowa, have invented certain new and useful Improvements in Nut-Tighteners for Silo-Rods, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for tightening nuts upon rods adapted to pass about silos, tanks, etc., and the object in view is to produce a simple and efficient device of this nature so arranged that the nuts may be tightened without the necessity of climbing to an elevation for the purpose of tightening the nuts by means of a wrench in the ordinary manner.

My invention comprises various details of construction and combinations and arrangements of parts which will be hereinafter fully described, shown in the accompanying drawings and then specifically defined in the appended claim.

I illustrate my invention in the accompanying drawings, in which:—

Figure 1 is a side elevation showing the device applied to one end of a rod and adapted to surround a silo. Fig. 2 is a side elevation of the device shown in Fig. 1, a portion of the rod being shown in section. Fig. 3 is an end view of a nut carrying socket member, and Fig. 4 is a sectional view longitudinally through the member illustrated in Fig. 3.

Reference now being had to the details of the drawings by letter, A designates a lever which is perforated at A' for the reception of a rod or rope B, forming a convenient means whereby the lever may be pulled down for the purpose of imparting, through mechanism which will be presently described, a rotary movement to a nut for the purpose of tightening the rod adapted to pass about a tank, silo or other object. Said lever has a forked end, one arm D of which is detachably held to the shank of the lever by means of the bolt E, while the other arm F is apertured for the reception of the nut carrying member H, details of which are shown in Fig. 4 of the drawings. Said member H is adapted to receive one end of the rod K to be tightened, which rod is threaded as at K' and adapted to receive a nut N. The socket end of the member H is angularly outlined as at H' to conform to the nut which is seated therein, causing the nut to turn with the member as the latter is rotated. A series of ratchet teeth O are formed about one end of said member, and L is pawl adapted to engage said teeth and has a pintle T, the ends of which are journaled, one in an aperture in the arm D and the other in the arm F, as shown clearly in the drawings. A spring S has one end engaging the rod K, as shown in Figs 1 and 2 of the drawings, said spring being coiled about the circumference of the contracted portion of the member H and its other end is adapted to engage one end of the pintle T, the purpose of the spring being to return the lever A to its farthest upper throw after having been pulled down by the rod or cord B in the act of imparting a rotary movement to the nut carried by the member H, it being understood that, when the lever A swings downward, the spring is put under tension and, when pull is released from the rod or cord B, the spring will return the lever to an upright position, the pawl riding idly over the ratchet teeth on its return movement to its starting position.

In practice, it is my plan to attach one of these devices to each nut upon the end of a rod which is adapted to surround a tank, silo or other object and affording means whereby the rods may be tightened by simply pulling down upon the wires, one connected to each lever, thus causing the nuts to draw the rods into a tighter binding relation with the object about which they surround and thus avoiding the necessity of going to an elevation to tighten the nuts with an ordinary wrench. In attaching the nut, it is removed from the hook or rod and put into the member or holder H by removing the detachable arm D, after which the end of the hook or rod is slipped through the hole in the member H until it reaches the nut which is screwed on to the hook until it is against the lug M, after which the lever may be worked in the manner described by merely pulling down upon the same, causing the nut to be tightened, the spring returning the lever to its upright position. In the event of it being desired to remove the hook or rod from the silo or other object to which it is applied, it may be conveniently done by removing the arm D of the lever, reversing the pawl and replacing the arm and operating the handle in the same manner as before.

What I claim to be new is:—

A device for tightening rods adapted to surround silos or tanks, comprising, in combination with the rod, an apertured plate through which the opposite ends of the rod pass, a lever having a forked end, the arms of which are apertured, one of which is detachable, means for fastening the same to the lever, a nut-carrying socket member through which said rod passes and which member is journaled in an opening in the fixed arm of the lever and the threaded end of the rod having a bearing in the detachable arm, a nut carried in said member, the circumference of the latter having ratchet teeth, a pawl having pintles journaled in apertures in said arms of the lever, a spring passing about said member and having one end bearing against said rod and the other end against the pintle of the pawl, as set forth.

In testimony whereof I hereunto affix my signature in the presence of two witnesses.

GEORGE M. ANDERSON.

Witnesses:
 CLARENCE LADD,
 E. A. WELSH.

---

Copies of this patent may be obtained for five cents each, by addressing the "Commissioner of Patents Washington, D. C."